United States Patent
Bains et al.

(10) Patent No.: US 8,595,428 B2
(45) Date of Patent: Nov. 26, 2013

(54) MEMORY CONTROLLER FUNCTIONALITIES TO SUPPORT DATA SWIZZLING

(75) Inventors: Kuljit S. Bains, Olympia, WA (US); Joseph H. Salmon, Placerville, CA (US)

(73) Assignee: Intel Corporation, Santa Clara, CA (US)

( * ) Notice: Subject to any disclaimer, the term of this patent is extended or adjusted under 35 U.S.C. 154(b) by 376 days.

(21) Appl. No.: 12/644,803

(22) Filed: Dec. 22, 2009

(65) Prior Publication Data

US 2011/0153925 A1    Jun. 23, 2011

(51) Int. Cl.
*G06F 12/00* (2006.01)
*G06F 13/00* (2006.01)
*G06F 13/28* (2006.01)

(52) U.S. Cl.
USPC ............................ 711/105; 711/154; 711/170

(58) Field of Classification Search
USPC .......................................... 711/105, 154, 170
See application file for complete search history.

(56) References Cited

U.S. PATENT DOCUMENTS

| 6,839,266 B1 * | 1/2005 | Garrett et al. .................... 365/69 |
| 6,925,620 B2 * | 8/2005 | Elzinga ......................... 716/115 |
| 2006/0236042 A1 * | 10/2006 | Jain et al. ....................... 711/154 |
| 2006/0294335 A1 * | 12/2006 | Vogt ............................... 711/170 |
| 2007/0005836 A1 * | 1/2007 | Jain et al. ........................ 710/62 |

FOREIGN PATENT DOCUMENTS

EP          1598745          11/2005

OTHER PUBLICATIONS

Combined Search and Examination Report for United Kingdom Patent Application No. GB1021586.1 mailed Apr. 13, 2011, 11 pgs.
Examination Report for United Kingdom Patent Application No. GB1021586.1 mailed Jun. 7, 2012, 3 pgs.
First Office Action for Chinese Patent Application No. 201010602391.2 mailed Mar. 21, 2013, 14 pgs.

* cited by examiner

*Primary Examiner* — Michael Alsip
(74) *Attorney, Agent, or Firm* — Blakely, Sokoloff, Taylor & Zafman LLP

(57) ABSTRACT

A memory controller that can determine a swizzling pattern between the memory controller and memory devices. The memory controller generates a swizzling map based on the determined swizzling pattern. The memory controller may internally swizzle data using the swizzling map before writing the data to memory so that the data appears in the correct order at the pins of the memory chip(s). On reads, the controller can internally de-swizzle the data before performing the error correction operations using the swizzling map.

20 Claims, 5 Drawing Sheets

MEMORY CONTROLLER FUNCTIONALITIES TO SUPPORT DATA SWIZZLING

TECHNICAL FIELD

Embodiments of the invention relate to memory architectures in electronic systems. More particularly, embodiments of the invention relate to techniques for supporting data swizzling and de-swizzling.

BACKGROUND

When a memory data bus of an electronic system is designed and routed from a memory controller to the memory modules, it is common to "swizzle" the traces to optimize routing within a byte or nibble of data. Data swizzling refers to routing of data lines on a printed circuit board (PCB) where data bit ordering is different on the memory controller side and the memory module side.

FIG. 1 illustrates an example of data swizzling between a memory controller and a memory module. FIG. 1 offers a 4-bit example with only two bits swizzled. In an actual implementation any number of bits with any amount of swizzling can be supported. Lines for two data bits (D1 and D3) are connected directly between the corresponding pins of memory controller 120 and memory device 140. That is, data bit D1 and data bit D3 transmitted from memory controller 120 are received as data bit D1 and data bit D3, respectively, by memory device 140. Transmission from memory device 140 to memory controller 120 operates in the same manner.

The other two data bits (D0 and D2) are swizzled. In the example of FIG. 1, the line for the pin corresponding to data bit D0 of memory controller 120 is coupled with the pin corresponding to data bit D2 of memory device 140. Similarly, the line for the pin corresponding to data bit D2 of memory controller 120 is coupled with the pin corresponding to data bit D0 of memory device 140.

Thus, as data travels from memory controller 120 to memory device 140 it is swizzled by the data lines. As the data travels back from memory device 140 to memory controller 120 it is de-swizzled and the data received by memory controller 120 is correctly ordered and ready for use.

This approach to data swizzling has been effective in many situations. However, as systems increase in complexity and robustness, simple swizzling techniques may not be sufficient.

BRIEF DESCRIPTION OF THE DRAWINGS

Embodiments of the invention are illustrated by way of example, and not by way of limitation, in the figures of the accompanying drawings in which like reference numerals refer to similar elements.

DETAILED DESCRIPTION

In the following description, numerous specific details are set forth. However, embodiments of the invention may be practiced without these specific details. In other instances, well-known circuits, structures and techniques have not been shown in detail in order not to obscure the understanding of this description.

Figure 1:
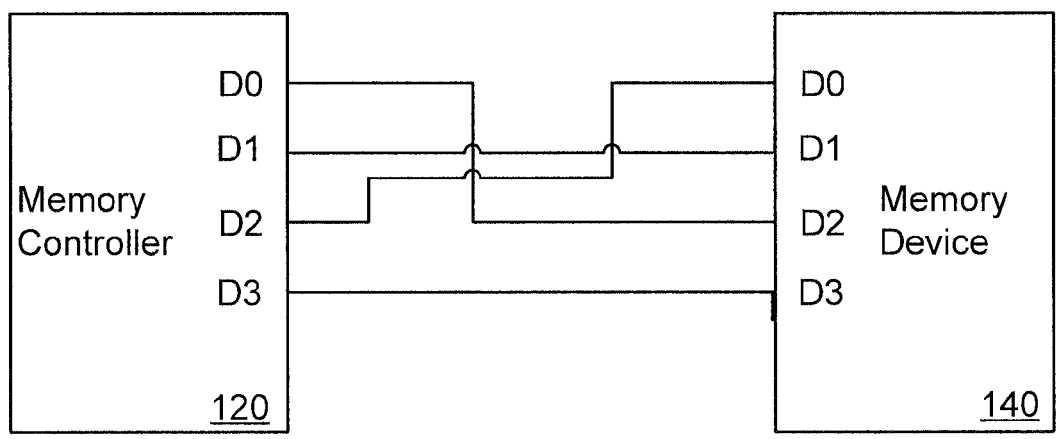
FIG. 1 illustrates an example of data swizzling between a memory controller and a memory module.

In systems supporting error check and/or error correction functionality, the swizzling technique illustrated in the example of FIG. 1 are ineffective. Error correction mechanisms require data ordering to operate effectively. Described herein are training techniques that cam be utilized by a memory controller to generate a swizzling map that can be used for error correction operations.

In one embodiment, the memory controller may internally swizzle data using the swizzling map before writing the data to memory so that the data appears in the correct order at the pins of the memory chip(s). On reads, the controller can internally de-swizzle the data before performing the error correction operations using the swizzling map.

Figure 2:
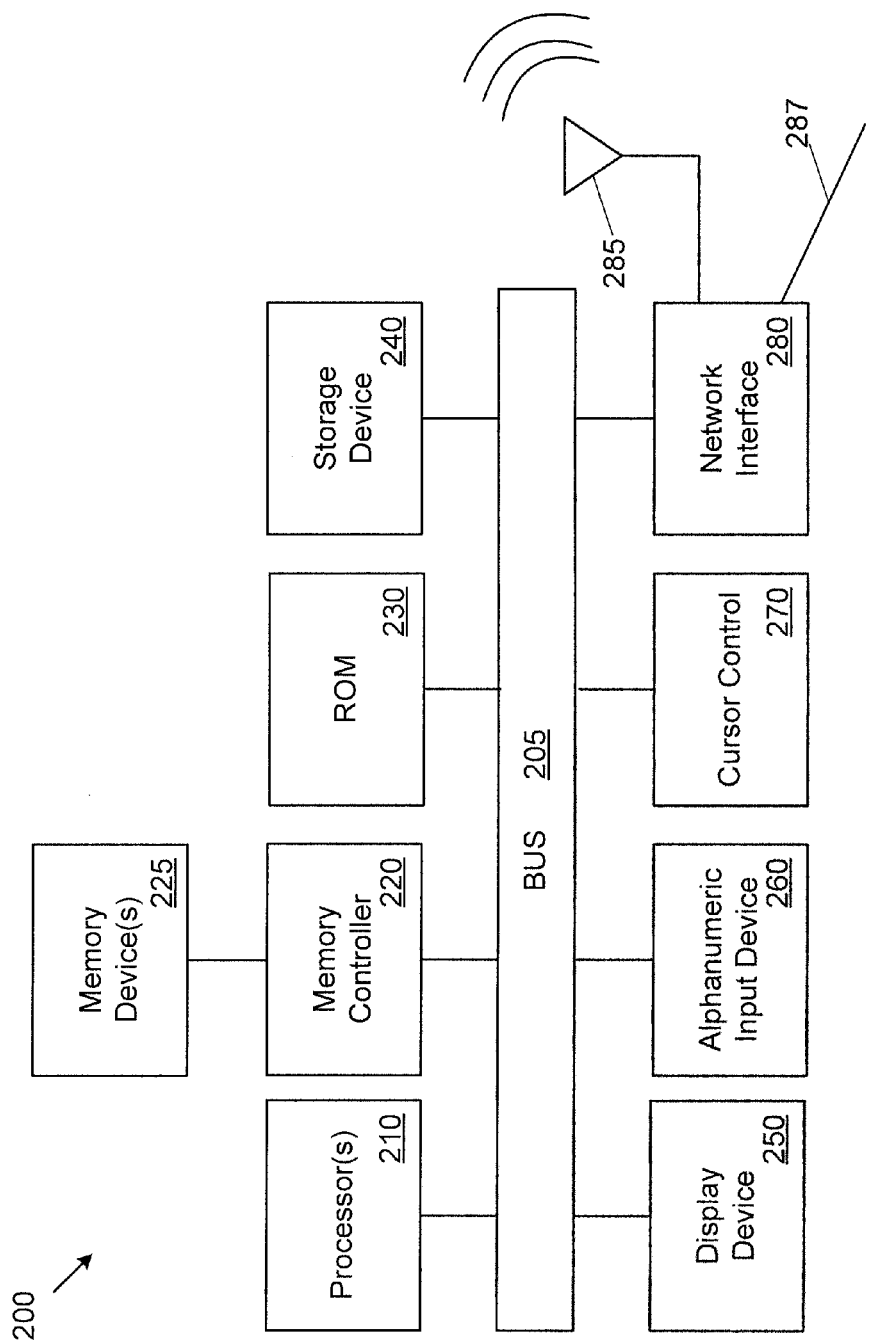
FIG. 2 is a block diagram of one embodiment of an electronic system.

FIG. 2 is a block diagram of one embodiment of an electronic system. The electronic system illustrated in FIG. 2 is intended to represent a range of electronic systems (either wired or wireless) including, for example, desktop computer systems, laptop computer systems, cellular telephones, personal digital assistants (PDAs) including cellular-enabled PDAs, set top boxes. Alternative electronic systems may include more, fewer and/or different components.

Electronic system 200 includes bus 205 or other communication device to communicate information, and processor 210 coupled to bus 205 that may process information. While electronic system 200 is illustrated with a single processor, electronic system 200 may include multiple processors and/or co-processors. Electronic system 200 further may include random access memory (RAM) or other dynamic storage device 225 (referred to as memory), coupled to memory controller 220 that is coupled to bus 205 and may store information and instructions that may be executed by processor 210. Memory 225 may also be used to store temporary variables or other intermediate information during execution of instructions by processor 210.

Memory device(s) 225 may be any of a variety of memory devices configured as, for example, single inline memory modules (SIMMs), dual inline memory modules (DIMMs), etc. The memory modules include one or more dynamic random access memory (DRAM) chips that are coupled to receive the data bits to be stored in memory 225. The DRAM chips can be, for example, 4-bit wide memory chips, 8-bit wide memory chips, 16-bit wide memory chips, etc.

Electronic system 200 may also include read only memory (ROM) and/or other static storage device 230 coupled to bus 205 that may store static information and instructions for processor 210. Data storage device 240 may be coupled to bus 205 to store information and instructions. Data storage device 240 such as a magnetic disk or optical disc and corresponding drive may be coupled to electronic system 200.

Electronic system 200 may also be coupled via bus 205 to display device 250, such as a cathode ray tube (CRT) or liquid crystal display (LCD), to display information to a user. Alphanumeric input device 260, including alphanumeric and other keys, may be coupled to bus 205 to communicate information and command selections to processor 210. Another type of user input device is cursor control 270, such as a mouse, a trackball, or cursor direction keys to communicate direction information and command selections to processor 210 and to control cursor movement on display 250.

Electronic system 200 further may include network interface(s) 280 to provide access to a network, such as a local area network. Network interface(s) 280 may include, for example, a wireless network interface having antenna 285, which may represent one or more antenna(e). Network interface(s) 280 may also include, for example, a wired network interface to communicate with remote devices via network cable 287, which may be, for example, an Ethernet cable, a coaxial cable, a fiber optic cable, a serial cable, or a parallel cable.

In one embodiment, network interface(s) 280 may provide access to a local area network, for example, by conforming to IEEE 802.11b and/or IEEE 802.11g standards, and/or the wireless network interface may provide access to a personal area network, for example, by conforming to Bluetooth standards. Other wireless network interfaces and/or protocols can also be supported.

IEEE 802.11b corresponds to IEEE Std. 802.11b-1999 entitled "Local and Metropolitan Area Networks, Part 11: Wireless LAN Medium Access Control (MAC) and Physical Layer (PHY) Specifications: Higher-Speed Physical Layer Extension in the 2.4 GHz Band," approved Sep. 16, 1999 as well as related documents. IEEE 802.11g corresponds to IEEE Std. 802.11g-2003 entitled "Local and Metropolitan Area Networks, Part 11: Wireless LAN Medium Access Control (MAC) and Physical Layer (PHY) Specifications, Amendment 4: Further Higher Rate Extension in the 2.4 GHz Band," approved Jun. 27, 2003 as well as related documents. Bluetooth protocols are described in "Specification of the Bluetooth System: Core, Version 1.1," published Feb. 22, 2001 by the Bluetooth Special Interest Group, Inc. Associated as well as previous or subsequent versions of the Bluetooth standard may also be supported.

In one embodiment, a swizzling map is generated by and utilized by a memory controller that is coupled with the memory devices. The memory controller may be hardwired to perform these functions or the memory controller may execute instructions stored in memory, firmware, or microcode. Further, any combination of the above may be supported.

Figure 3:
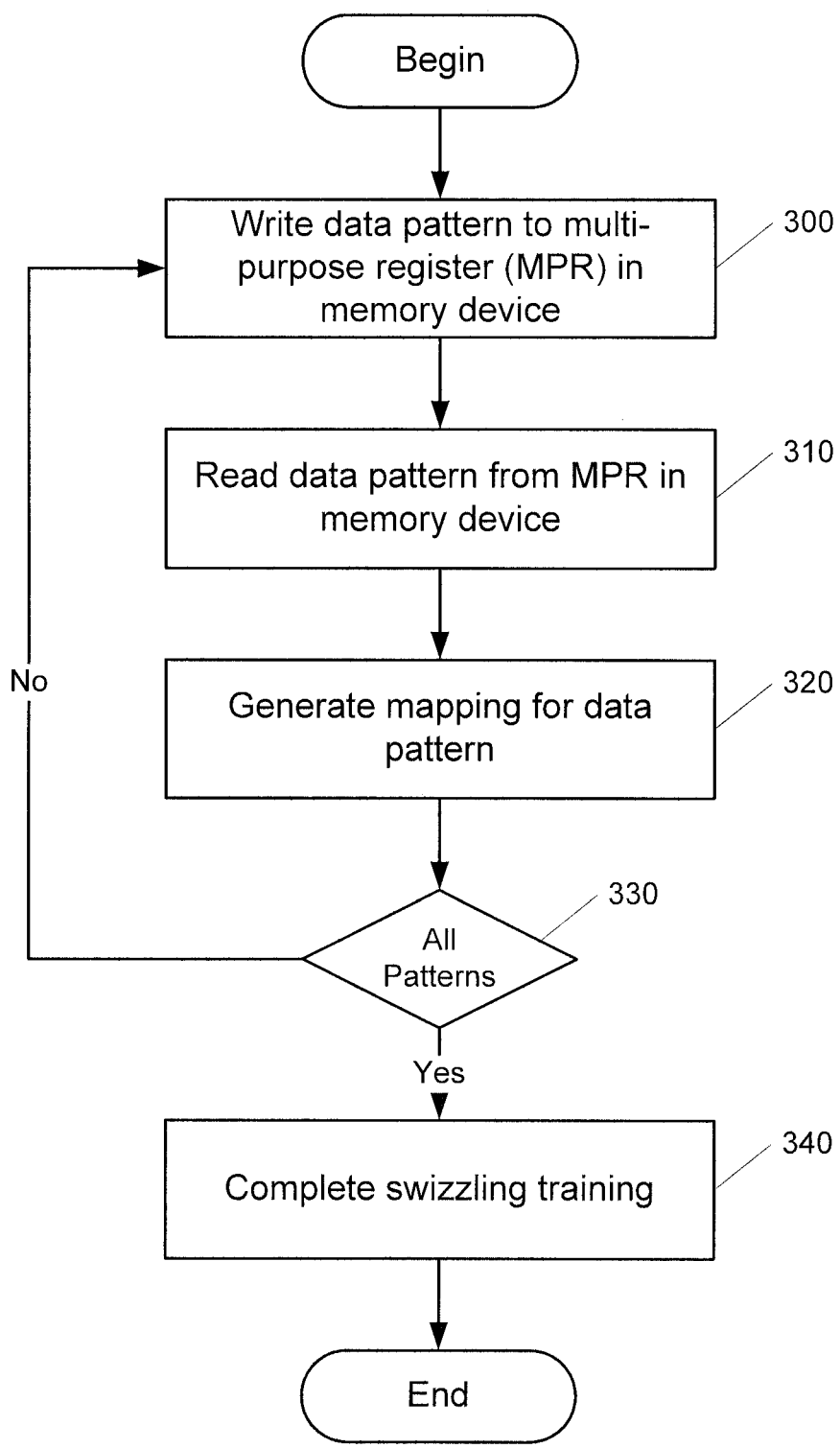
FIG. 3 is a flow diagram of one embodiment of a technique for generation of a swizzling map.

FIG. 3 is a flow diagram of one embodiment of a technique for generation of a swizzling map. The example of FIG. 3 is for an 8-bit wide memory device; however, other memory widths (e.g., 4-bits, 16-bits) can be supported. As described in greater detail below, the swizzling map allows the memory controller to internally swizzle the data before writing the data to memory so that the data bits appear in the correct order at the memory device pins.

The training process is accomplished by writing a data pattern to a multi-purpose register (MPR) in the memory device, 300. In one embodiment, a "walking 0" pattern is used. In an alternate embodiment, a "walking 1" pattern may be used. Using the walking 0 pattern example, the first data pattern written to the MPR is "1111 1110" for an 8-bit wide device. The data pattern is written to the MPR using the address bus, which is not swizzled.

The data pattern is read from the MPR in the memory device, 310. The data line that returns the "0" is mapped to the corresponding memory controller bit, 320. For example, if the pattern written to the MPR is "1111 1110" and the pattern read from the MPR is "1110 1111" then bit zero (DQ0) of the memory controller is mapped to bit four (D4) of the memory device.

The process of 300, 310 and 320 are completed for all iterations of the data pattern. If all patterns are not completed, 330, a subsequent pattern is written to the MPR, 300. Continuing the walking 0 example from above, the second pattern written to the MPR may be "1111 1101". The pattern is read from the MPR, 310. The data line that returns the "0" is mapped to the corresponding memory controller bit, 320. For example, if the pattern written to the MPR is "1111 1101" and the pattern read from the MPR is "1111 0111" then bit one (DQ1) of the memory controller is mapped to bit three (D3) of the memory device.

If all patterns are complete, 330, swizzling training may be completed, 340. Completion of swizzling training may include, for example, storing of mapping data to a table in the memory controller, sending an indication that the training has completed and that data operations may commence.

Figure 4:
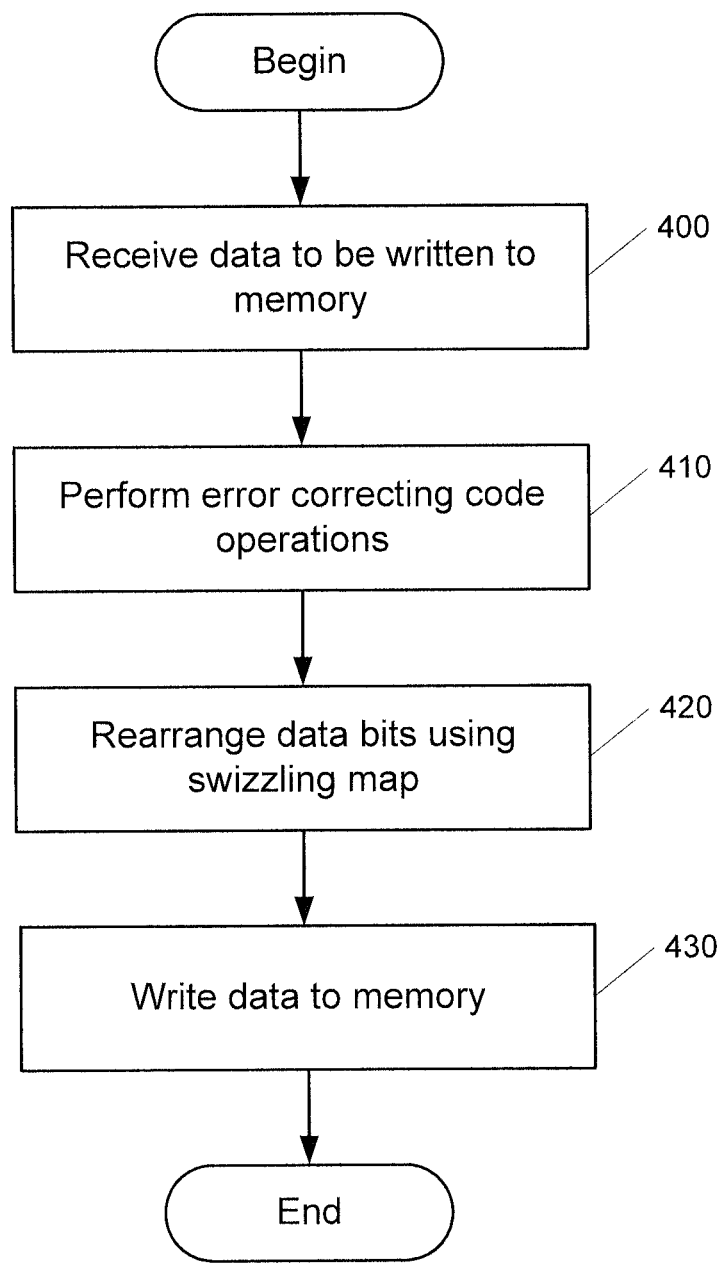
FIG. 4 is a flow diagram of one embodiment of a technique for writing data to memory using a swizzling map and error correcting code.

FIG. 4 is a flow diagram of one embodiment of a technique for writing data to memory using a swizzling map and error correcting code. The memory controller receives data to be written to memory, 400. Error correcting code operations are performed on the data, 410. Any ECC polynomial may be used.

The data bits are rearranged using the swizzling map, 420. The bits are rearranged so that the data bits reach the pins of the memory device in the correct order. This allows the memory device to apply ECC operations to detect and/or correct data errors. The data received by the memory device is stored, 430.

Figure 5:
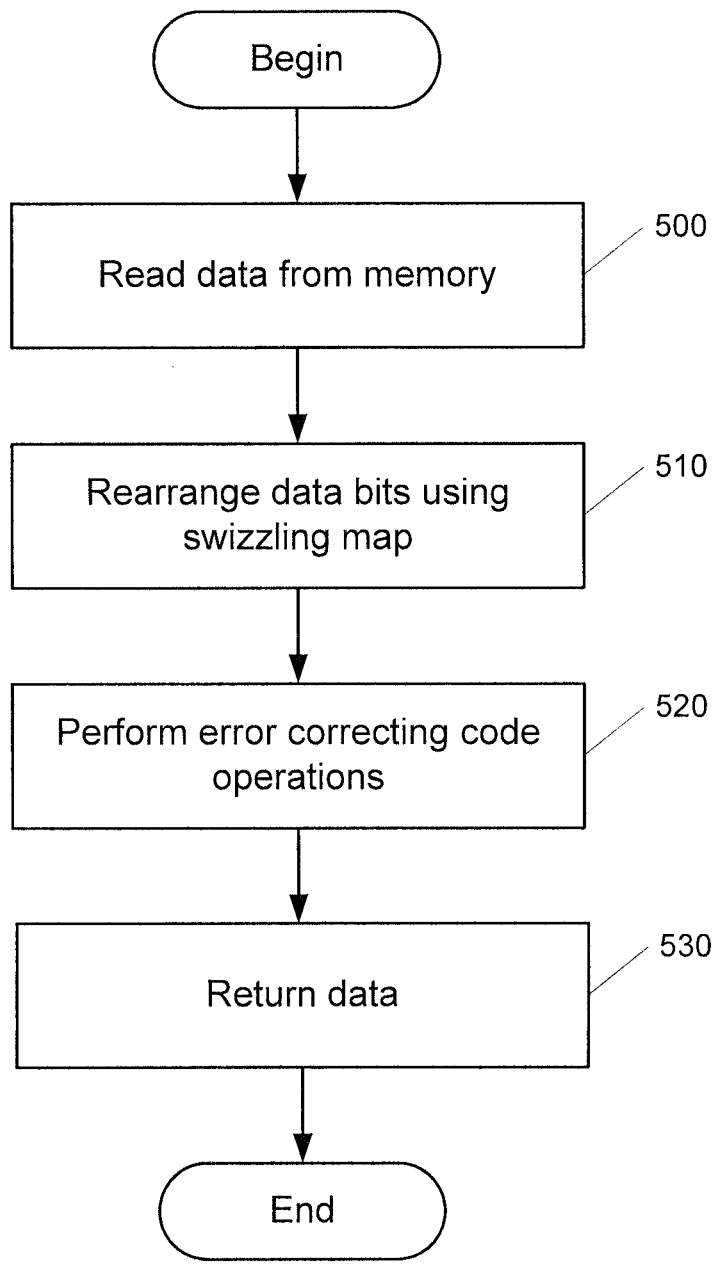
FIG. 5 is a flow diagram of one embodiment of a technique for reading data from memory using a swizzling map and error correcting code.

FIG. 5 is a flow diagram of one embodiment of a technique for reading data from memory using a swizzling map and error correcting code. The data is read from the memory device, 500. The data bits are rearranged using the swizzling map, 510. ECC operations are performed on the rearranged data bits, 520. The data is returned (e.g., to a processor) for use, 530.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

While the invention has been described in terms of several embodiments, those skilled in the art will recognize that the invention is not limited to the embodiments described, but can be practiced with modification and alteration within the spirit and scope of the appended claims. The description is thus to be regarded as illustrative instead of limiting.

What is claimed is:

1. A system comprising:
a memory device having a n-bit multi-purpose register (MPR); and
a memory controller coupled with the memory device, the memory controller to, for at least N combinations of N bits, wherein N is equal to the number of bits in the MPR:
write a bit combination to the MPR over a non-swizzled address bus,
read the bit combination from the MPR over a swizzled data bus, and
generate a mapping of bit ordering between the memory device and the memory controller corresponding to the swizzled data bus,
the memory controller to internally swizzle data using the mapping before writing the data to the memory so that the data appears in the correct order at pins of a memory chip, and on reads, the memory controller internally de-swizzles the data before performing error correction operations using the mapping.

2. The system of claim 1 wherein the memory device comprises a dynamic random access memory (DRAM) integrated circuit (IC) on a dual inline memory module (DIMM).

3. The system of claim 1 wherein the memory controller to, for at least N combinations of N bits, write a bit combination to the MPR comprises, for an 8-bit memory device sequentially writing a walking "0" pattern to the MPR.

4. The system of claim 1 wherein the memory controller to, for at least N combinations of N bits, write a bit combination to the MPR comprises, for an 8-bit memory device sequentially writing a walking "1" pattern to the MPR.

5. The system of claim 1 further comprising a plurality of memory devices, wherein the memory controller generates a mapping of bits between the memory controller and the plurality of memory devices for each rank of memory.

6. The system of claim 1 wherein the data written to memory comprises a 72-bit block having a 64-bit data portion rearranged by the memory controller according to the mapping and an 8-bit error correcting code (ECC) checksum.

7. The system of claim 1 wherein the memory controller further reads a block of data from the memory device and applies the mapping and error correcting code to the data read from the memory device.

8. A method of routing data in an electronics system comprising a memory device having a multi purpose register (MPR) with a plurality of bits and a memory controller coupled to the memory device, the method comprising the memory controller:
   writing, for at least N combinations of N bits a bit combination to a multi-purpose register (MPR) in a memory device over a non-swizzled address bus;
   reading the bit combination from the MPR over a swizzled data bus;
   generating a mapping of bit ordering of the swizzled data bus between the memory device and a memory controller based on a comparison of the bit combinations written to the MPR and the corresponding bit combinations read from the MPR;
   swizzling, with the memory controller using the mapping, data to be written to the memory device so that the data appears in correct order at pins of a memory chip; and
   de-swizzling, on reads with the memory controller, using the mapping, the data before performing the error correction operations.

9. The method of claim 8 wherein the memory device comprises a dynamic random access memory (DRAM) integrated circuit (IC) on a dual inline memory module (DIMM).

10. The method of claim 8 wherein the at least N combinations of N bits, write a bit combination to the MPR comprises, for an 8-bit memory device sequentially writing a walking "0" pattern to the MPR, the bit combinations comprising at least:
   1111 1110,
   1111 1101,
   1111 1011,
   1111 0111,
   1110 1111,
   1101 1111,
   1011 1111, and
   0111 1111.

11. The method of claim 8 wherein least N combinations of N bits, write a bit combination to the MPR comprises, for an 8-bit memory device sequentially writing a walking "1" pattern to the MPR, the bit combinations comprising at least:
   0000 0001,
   0000 0010,
   0000 0100,
   0000 1000,
   0001 0000,
   0010 0000,
   0100 0000,
   1000 0000.

12. The method of claim 8, in a system having multiple memory devices, further comprising generating a mapping for each memory device.

13. The method of claim 8 wherein the data written to memory comprises a 72-bit block having a 64-bit data portion rearranged by the memory controller according to the mapping and an 8-bit error correcting code (ECC) checksum.

14. The method of claim 8 further comprising reading, with the memory controller, a block of data from the memory device and applies the mapping and error correcting code to the data read from the memory device.

15. An article comprising a computer-readable medium having stored thereon, instructions that, when executed, cause a memory controller to:
   write, for at least N combinations of N bits a bit combination to a multi-purpose register (MPR) in a memory device over a non-swizzled address bus;
   read the bit combination from the MPR over a swizzled data bus;
   generate a mapping of bit ordering of the swizzled data bus between the memory device and a memory controller based on a comparison of the bit combinations written to the MPR and the corresponding bit combinations read from the MPR; and
   swizzle, with the memory controller using the mapping, data to be written to the memory device so that the data appears in correct order at pins of a memory chip; and
   de-swizzle, on reads with the memory controller, using the mapping, the data before performing the error correction operations.

16. The article of claim 15 wherein the memory device comprises a dynamic random access memory (DRAM) integrated circuit (IC) on a dual inline memory module (DIMM).

17. The article of claim 15 wherein the at least N combinations of N bits, write a bit combination to the MPR comprises, for an 8-bit memory device sequentially writing a walking "0" pattern to the MPR, the bit combinations comprising at least:
   1111 1110,
   1111 1101,
   1111 1011,
   1111 0111,
   1110 1111,
   1101 1111,
   1011 1111, and
   0111 1111.

18. The article of claim 15 wherein least N combinations of N bits, write a bit combination to the MPR comprises, for an 8-bit memory device sequentially writing a walking "1" pattern to the MPR, the bit combinations comprising at least:
   0000 0001,
   0000 0010,
   0000 0100,
   0000 1000,
   0001 0000,
   0010 0000,
   0100 0000,
   1000 0000.

19. The article of claim 15 wherein the data written to memory comprises a 72-bit block having a 64-bit data portion rearranged by the memory controller according to the mapping and an 8-bit error correcting code (ECC) checksum.

20. The article of claim 15 further comprising reading, with the memory controller, a block of data from the memory device and applies the mapping and error correcting code to the data read from the memory device.

* * * * *